United States Patent
Guo et al.

(10) Patent No.: US 10,218,176 B2
(45) Date of Patent: Feb. 26, 2019

(54) METHOD AND DEVICE FOR CONTROLLING LOCAL VOLTAGE

(71) Applicants: Tsinghua University, Beijing (CN); ELECTRIC POWER RESEARCH INSTITUTE OF GUANGDONG POWER GRID CO., LTD., Guangzhou, Guangdong (CN)

(72) Inventors: Qinglai Guo, Beijing (CN); Hongbin Sun, Beijing (CN); Boming Zhang, Beijing (CN); Wenchuan Wu, Beijing (CN); Huaichang Ge, Beijing (CN); Mingye Zhang, Beijing (CN); Yongwang Zhang, Guangdong (CN); Wei Zhao, Guangdong (CN); Guoying Lin, Guangdong (CN)

(73) Assignees: TSINGHUA UNIVERSITY, Beijing (CN); ELECTRIC POWER RESEARCH INSTITUTE OF GUANGDONG POWER GRID CO., LTD., Guangzhou, Guangdong (CN)

( * ) Notice: Subject to any disclaimer, the term of this patent is extended or adjusted under 35 U.S.C. 154(b) by 449 days.

(21) Appl. No.: 15/009,770

(22) Filed: Jan. 28, 2016

(65) Prior Publication Data
US 2016/0233685 A1    Aug. 11, 2016

(30) Foreign Application Priority Data

Jan. 29, 2015    (CN) .......................... 2015 1 0045025

(51) Int. Cl.
*H02J 4/00* (2006.01)
*H02J 3/14* (2006.01)
*B60L 11/18* (2006.01)

(52) U.S. Cl.
CPC ............. *H02J 3/14* (2013.01); *B60L 11/1842* (2013.01); *B60L 11/1844* (2013.01);
(Continued)

(58) Field of Classification Search
CPC ......................................................... H02J 4/00
See application file for complete search history.

(56) References Cited

U.S. PATENT DOCUMENTS

| 4,707,760 A | * | 11/1987 | Allos | ....................... H02H 3/24 |
| | | | | 307/140 |
| 2009/0121544 A1 | * | 5/2009 | Bailey | ................. B60L 11/1816 |
| | | | | 307/10.1 |
| 2012/0146583 A1 | * | 6/2012 | Gaul | ................... B60L 11/1838 |
| | | | | 320/109 |

FOREIGN PATENT DOCUMENTS

| CN | 102709916 A | 10/2012 |
| KR | 20110116683 A | 10/2011 |

OTHER PUBLICATIONS office action from SIPO for CN application 201510045025.8.
English translation of office action from SIPO for CN application 201510045025.8.

* cited by examiner

*Primary Examiner* — Tejal Gami
(74) *Attorney, Agent, or Firm* — Houtteman Law LLC

(57) ABSTRACT

A method and a device for controlling a local voltage are provided. The method includes: obtaining a first voltage value of a high-voltage side bus in a local transformer substation; determining a control strategy according to a starting threshold value for a voltage enhancement control, a starting threshold value for an under-voltage load shedding and the first voltage value of the high-voltage side bus; and performing the control strategy to control a charging power of an electric vehicle charging station corresponding to the
(Continued)

local transformer substation, so as to control the local voltage of the local transformer substation.

13 Claims, 5 Drawing Sheets

(52) U.S. Cl.
CPC ........... *Y02E 60/721* (2013.01); *Y02T 90/168* (2013.01); *Y04S 10/126* (2013.01); *Y04S 30/12* (2013.01)

METHOD AND DEVICE FOR CONTROLLING LOCAL VOLTAGE

CROSS-REFERENCE TO RELATED APPLICATION

This application claims priority to and benefits of Chinese Patent Application No. 201510045025.8, filed with the State Intellectual Property Office of P. R. China on Jan. 29, 2015, the entire content of which is incorporated herein by reference.

FIELD

The present disclosure relates to the field of power system operation and control, and more particularly, to a method and a device for controlling a local voltage.

BACKGROUND

As energy shortages are becoming more and more serious and the calling for the environmental protection is becoming louder, the electric vehicles as a low-carbon, clean transportation, is highly concerned by governments worldwide. With the popularity of electric vehicles, the large-scale electric vehicles require to access the power grid for charging, which will have the noticeable influence on the operation of power grid. From the perspective of the power grid, with changes in requirements of urban development, there are long-distance, high-voltage transmission lines for connecting the load center with power plants, which may lead to the voltage security issues in the power grid. There are thresholds for transmission powers in the transmission system, too much energy demand of the receiving-end power grid will pose a threat to the safe operation of power grid. The load margin evaluation and control of the power grid are always concerned by dispatching personnel during the power grid operation. If the large-scale electric vehicles access to the power grid, charging powers of a large number of electric vehicles will aggravate the voltage security issues. Therefore, the voltage security evaluation and monitoring of the power grid in consideration of the access of large-scale electric vehicles should get more attention by electricity workers.

In recent decades, there are a number of voltage collapse accidents, resulting in serious economic losses. The control method responding to the voltage security which is widely applied is the under-voltage load shedding technology. However, this technology has the following defects: Firstly, this technology cannot realize a preventive control, and thus cannot carry out preventive measures which avoid the decline of power grid voltage in the case of hidden troubles existing in the power grid; secondly, this technology enables the power grid to be out of the dangerous state by way of load shedding, but it is difficult to restore the shed load, so that the control is not economic.

SUMMARY

Embodiments of a first aspect of the present disclosure provide a method for controlling a local voltage, including: S1, obtaining a first voltage value of a high-voltage side bus in a local transformer substation; S2, determining a control strategy according to a starting threshold value for a voltage enhancement control, a starting threshold value for an under-voltage load shedding and the first voltage value of the high-voltage side bus, in which the starting threshold value for the voltage enhancement control and the starting threshold value for the under-voltage load shedding are predetermined; S3, performing the control strategy to control a charging power of an electric vehicle charging station corresponding to the local transformer substation, so as to control the local voltage of the local transformer substation.

With the method for controlling a local voltage according to embodiments of the present disclosure, by obtaining the first voltage value of the high-voltage side bus in the local transformer substation, and by determining the control strategy according to the starting threshold value for the voltage enhancement control, the starting threshold value for the under-voltage load shedding and the first voltage value of the high-voltage side bus, and then by performing the control strategy to control a charging power of an electric vehicle charging station corresponding to the local transformer substation, so as to control the local voltage of the local transformer substation, i.e. by collecting the voltage value of the high-voltage side bus in the local transformer substation, information about the electric vehicle charging power of the electric vehicle charging station corresponding to the local transformer substation, and by controlling the electric vehicle charging power of the electric vehicle charging station, the voltage security of the power grid may be ensured, the voltage stability of the power system may be optimized and the risk of the power system voltage collapse may be reduced.

Embodiments of a second aspect of the present disclosure provide a device for controlling a local voltage, including:
  a processor; and
  a memory for storing instructions executable by the processor;
  in which the processor is configured to:
  obtain a first voltage value of a high-voltage side bus in a local transformer substation;
  determine a control strategy according to a starting threshold value for a voltage enhancement control, a starting threshold value for an under-voltage load shedding and the first voltage value of the high-voltage side bus, in which the starting threshold value for the voltage enhancement control and the starting threshold value for the under-voltage load shedding are predetermined; and
  perform the control strategy to control a charging power of an electric vehicle charging station corresponding to the local transformer substation, so as to control the local voltage of the local transformer substation With the device for controlling a local voltage according to embodiments of the present disclosure, by obtaining the first voltage value of the high-voltage side bus in the local transformer substation, and by determining the control strategy according to the starting threshold value for the voltage enhancement control, the starting threshold value for the under-voltage load shedding and the first voltage value of the high-voltage side bus, and then by performing the control strategy to control a charging power of an electric vehicle charging station corresponding to the local transformer substation, so as to control the local voltage of the local transformer substation, i.e. by collecting the voltage value of the high-voltage side bus in the local transformer substation, information about the electric vehicle charging power of the electric vehicle charging station corresponding to the local transformer substation, and by controlling the electric vehicle charging power of the electric vehicle charging station, the voltage security of the power grid may be ensured, the voltage stability of the power system may be optimized and the risk of the power system voltage collapse may be reduced.

Embodiments of a third aspect of the present disclosure provide a non-transitory computer readable storage medium, including a computer program stored thereon, which when executed by an instruction execution system, configures the system to implement a method for controlling a local voltage, the method including: S1, obtaining a first voltage value of a high-voltage side bus in a local transformer substation; S2, determining a control strategy according to a starting threshold value for a voltage enhancement control, a starting threshold value for an under-voltage load shedding and the first voltage value of the high-voltage side bus, in which the starting threshold value for the voltage enhancement control and the starting threshold value for the under-voltage load shedding are predetermined; S3, performing the control strategy to control a charging power of an electric vehicle charging station corresponding to the local transformer substation, so as to control the local voltage of the local transformer substation.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
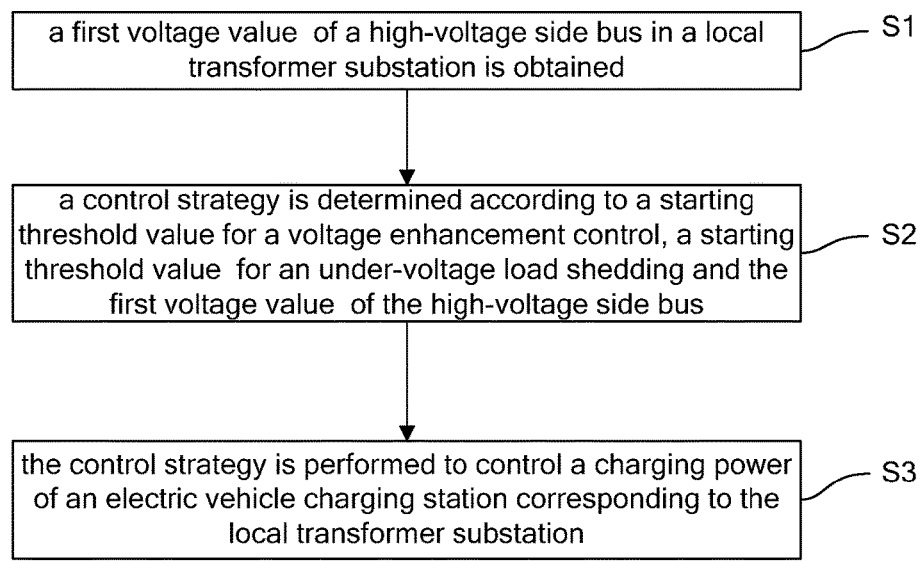
FIG. 1 is a flow chart showing a method for controlling a local voltage according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

From the perspective of load characteristics, compared with traditional loads, the charging power of the electric vehicle may be regulated faster and the regulated quantity is controllable; further compared with power consumers, for example, factories, residents, etc., charging devices are less sensitive to the regulation of power. In addition, the electric vehicle has a time shifting characteristic. That is, the user concerns a certain quantity of charging capacity during a certain period rather than the charging power at some specific time point. Therefore, when the power grid voltage is under an emergency condition, the current power grid operation pressure may be relieved by shifting the electric vehicle charging load backwards. So it is a problem worth deeply thinking by electric workers how to help the power grid to pass through the critical time by making full use of the flexible characteristics of the electric vehicle charging load and increasing the benign interaction between the electric vehicle charging load and the power system.

Therefore, a method and a device for controlling a local voltage of the electric vehicle charging load are provided in the present disclosure, which may introduce the electric vehicle charging load into the power grid voltage security control system, thus enhancing the power grid voltage security and ensuring the security and stable operation of the power grid. In the following, a method and a device for controlling a local voltage according to embodiments of the present disclosure will be described in detail with reference to drawings.

FIG. 1 is a flow chart showing a method for controlling a local voltage according to an embodiment of the present disclosure. As shown in FIG. 1, the method for controlling a local voltage includes following steps.

S1, a first voltage value $V_t$ of a high-voltage side bus in a local transformer substation is obtained.

Specifically, the first voltage value $V_t$ of the high-voltage side bus is collected by a measurement device in the local transformer substation in real time.

S2, a control strategy is determined according to a starting threshold value $V_1^{thr}$ for a voltage enhancement control, a starting threshold value $V_2^{thr}$ for an under-voltage load shedding and the first voltage value $V_t$ of the high-voltage side bus, in which the starting threshold value $V_1^{thr}$ for the voltage enhancement control and the starting threshold value $V_1^{thr}$ for the under-voltage load shedding are predetermined.

In some embodiments, the starting threshold value $V_1^{thr}$ for the voltage enhancement control and the starting threshold value $V_1^{thr}$ for the under-voltage load shedding are obtained from a power grid dispatching center.

S3, the control strategy is performed to control a charging power of an electric vehicle charging station corresponding to the local transformer substation, so as to control the local voltage of the local transformer substation.

It should be noted that, steps S1-S3 may be performed at intervals. For example, the control strategy may be performed per one hour, thus the charging power may be adjusted at intervals. Specifically, after the charging power of the electric vehicle charging station is adjusted, the electric vehicle charging station charges electric vehicles according to the adjusted charging power for a predetermined time period, and then the control strategy is determined again and then is performed.

In some embodiments, if the first voltage value $V_t$ of the high-voltage side bus is less than the starting threshold value $V_1^{thr}$ for the voltage enhancement control and larger than the starting threshold value $V_2^{thr}$ for the under-voltage load shedding, the control strategy is a voltage enhancement control strategy; and if the first voltage value $V_t$ of the high-voltage side bus is less than the starting threshold value $V_2^{thr}$ for the under-voltage load shedding, the control strategy is a voltage emergency control strategy. In addition, if the first voltage value $V_t$ of the high-voltage side bus is larger than the starting threshold value $V_1^{thr}$ for the voltage enhancement control, no control measure is required.

In other words, there are two control strategies including a voltage enhancement control strategy and a voltage emergency control strategy in embodiments of the present disclosure. That is, the method for controlling a local voltage according to embodiments of the present disclosure may operate in two operation ranges, in which the two operation ranges may be a voltage enhancement control range and a voltage emergency control range. Different control strategies may be selected to perform corresponding calculations and controls according to different voltage measurement values of the local node in the method for controlling a local voltage.

Figure 2:
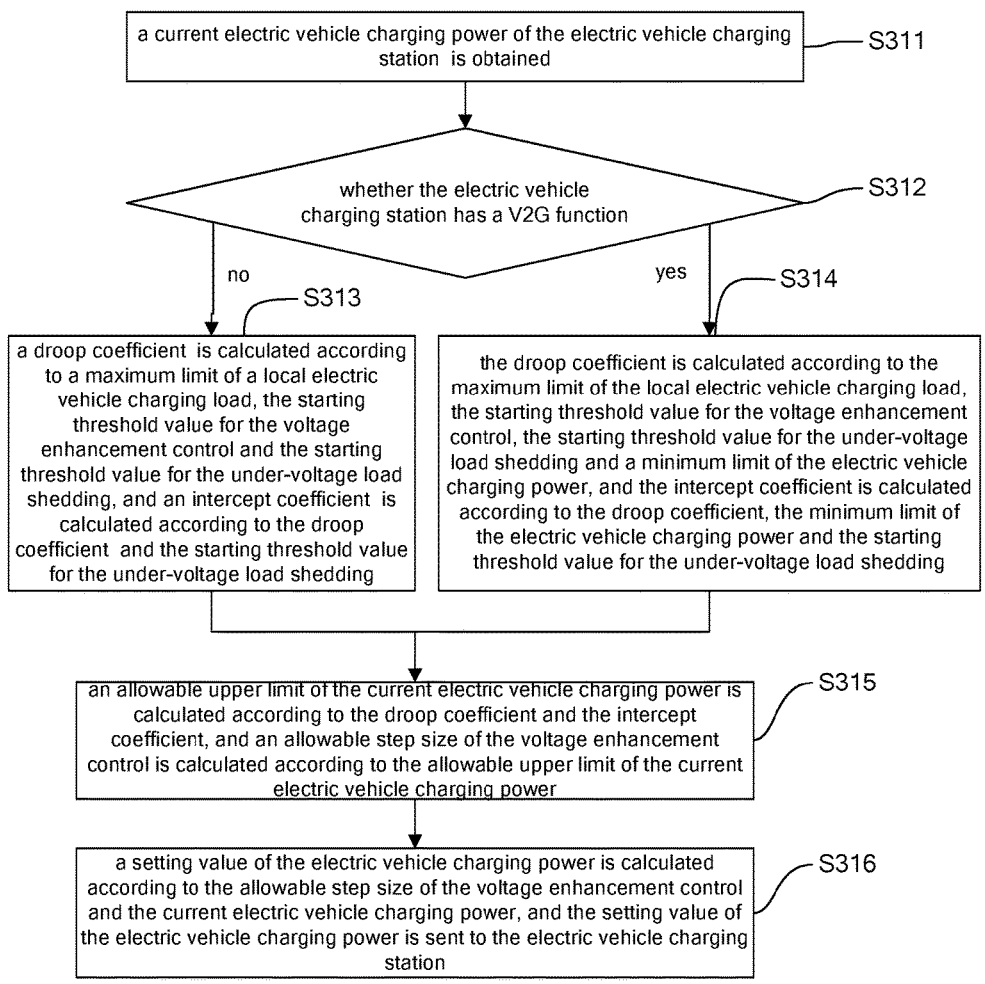
FIG. 2 is a flow chart showing a method for performing a voltage enhancement control strategy according to an embodiment of the present disclosure.

More specifically, in embodiments of the present disclosure, if the first voltage value $V_t$ of the high-voltage side bus is less than the starting threshold value $V_1^{thr}$ for the voltage enhancement control and larger than the starting threshold value $V_2^{thr}$ for the under-voltage load shedding, the voltage enhancement control strategy is performed. Specifically, as shown in FIG. 2, the step of performing the voltage enhancement control strategy includes following steps.

S311, a current electric vehicle charging power $P_{EV}$ of the electric vehicle charging station corresponding to the local transformer substation is obtained.

S312, it is judged whether the electric vehicle charging station has a vehicle-to-grid (V2G) function.

It should be noted that, in some embodiments, V2G function describes such a system: when hybrid electric vehicles or pure electric vehicles are not running, energy is transferred to the power grid by electric motors coupled to the power grid, conversely, when batteries of electric vehicles are needed to be charged, electricity may be extracted out from the power grid to the batteries.

S313, if the electric vehicle charging station does not have the vehicle-to-grid function, a droop coefficient α is calculated according to a maximum limit $P_{EV}^{max}$ of a local electric vehicle charging load, the starting threshold value $V_1^{thr}$ for the voltage enhancement control and the starting threshold value $V_2^{thr}$ for the under-voltage load shedding, and an intercept coefficient β is calculated according to the droop coefficient α and the starting threshold value $V_2^{thr}$ for the under-voltage load shedding, in which the maximum limit $P_{EV}^{max}$ of the local electric vehicle charging load is predetermined and obtained from the power grid dispatching center.

Specifically, if the electric vehicle charging station does not have the vehicle-to-grid function, the droop coefficient α is obtained by a following formula (1) according to the maximum limit $P_{EV}^{max}$ of the local electric vehicle charging load, the starting threshold value $V_1^{thr}$ for the voltage enhancement control and the starting threshold value $V_2^{thr}$ for the under-voltage load shedding, and the intercept coefficient β is calculated by a following formula (2) according to the droop coefficient α and the starting threshold value $V_2^{thr}$ for the under-voltage load shedding, in which the formula (1) and formula (2) are respectively denoted as follows, $$\alpha = \frac{P_{EV}^{max}}{V_1^{thr} - V_2^{thr}}, \tag{1}$$

$$\beta = -\alpha V_2^{thr}. \tag{2}$$

S314, if the electric vehicle charging station has the vehicle-to-grid function, the droop coefficient α is calculated according to the maximum limit $P_{EV}^{max}$ of the local electric vehicle charging load, the starting threshold value $V_1^{thr}$ for the voltage enhancement control, the starting threshold value $V_2^{thr}$ for the under-voltage load shedding and a minimum limit $P_{EV}^{min}$ of an electric vehicle charging power, and the intercept coefficient β is calculated according to the droop coefficient α, the minimum limit $P_{EV}^{min}$ of the electric vehicle charging power and the starting threshold value $V_2^{thr}$ for the under-voltage load shedding.

In some embodiments, the method further includes a step of obtaining a battery storage capacity $W_{EV}$ of all electric vehicles in the electric vehicle charging station, in which the battery storage capacity $W_{EV}$ of all the electric vehicles in the electric vehicle charging station is predetermined.

In some embodiments, the minimum limit $P_{EV}^{min}$ of the electric vehicle charging power is obtained by a following formula (3), in which the formula (3) is denoted as:

$$P_{EV}^{min} = -\frac{W_{EV}}{t_p} \tag{3}$$

where $t_p$ is a predetermined time period, representing a time interval between each twice voltage enhancement controls (for example, 1 minute).

Specifically, if the electric vehicle charging station has the vehicle-to-grid function, the droop coefficient α is obtained by a following formula (4) according to the maximum limit $P_{EV}^{max}$ of the local electric vehicle charging load, the starting threshold value $V_1^{thr}$ for the voltage enhancement control, the starting threshold value $V_2^{thr}$ for the under-voltage load shedding and the minimum limit $P_{EV}^{min}$ of the electric vehicle charging power, and the intercept coefficient β is calculated by a following formula (5) according to the droop coefficient α, the minimum limit $P_{EV}^{min}$ of the electric vehicle charging power and the starting threshold value $V_2^{thr}$ for the under-voltage load shedding, in which the formula (1) and formula (2) are respectively denoted as follows, $$\alpha = \frac{P_{EV}^{max} - P_{EV}^{min}}{V_1^{thr} - V_2^{thr}}, \tag{4}$$

$$\beta = P_{EV}^{min} - \alpha V_2^{thr}. \tag{5}$$

S315, an allowable upper limit $\overline{P}_{EV}$ of the current electric vehicle charging power $P_{EV}$ is calculated according to the droop coefficient α and the intercept coefficient β, and an allowable step size $dP_{EV}$ of the voltage enhancement control is calculated according to the allowable upper limit $\overline{P}_{EV}$ of the current electric vehicle charging power $P_{EV}$.

Specifically, the allowable upper limit $\overline{P}_{EV}$ of the current electric vehicle charging power $P_{EV}$ is calculated by a following formula (6) according to the droop coefficient α and the intercept coefficient, in which the formula (6) is denoted as follow:

$$\overline{P}_{EV} = \alpha V_t + \beta \tag{6}$$

In addition, the allowable step size $dP_{EV}$ of the voltage enhancement control is calculated by a following formula (7), in which the formula (7) is denoted as follow:

$$dP_{EV} = \begin{cases} \overline{P}_{EV} - P_{EV}, & \text{if } 0 < \overline{P}_{EV} - P_{EV} \le dP_{EV}^{max} \\ dP_{EV}^{max}, & \text{if } \overline{P}_{EV} - P_{EV} > dP_{EV}^{max} \end{cases} \tag{7}$$

where $dP_{EV}^{max}$ represents an allowable maximum step size in a single voltage enhancement control. In some embodiments, the allowable maximum step size $dP_{EV}^{max}$ of the voltage enhancement control may be obtained by artificially setting, for example, the value of which may be 1 MW.

Figure 3:
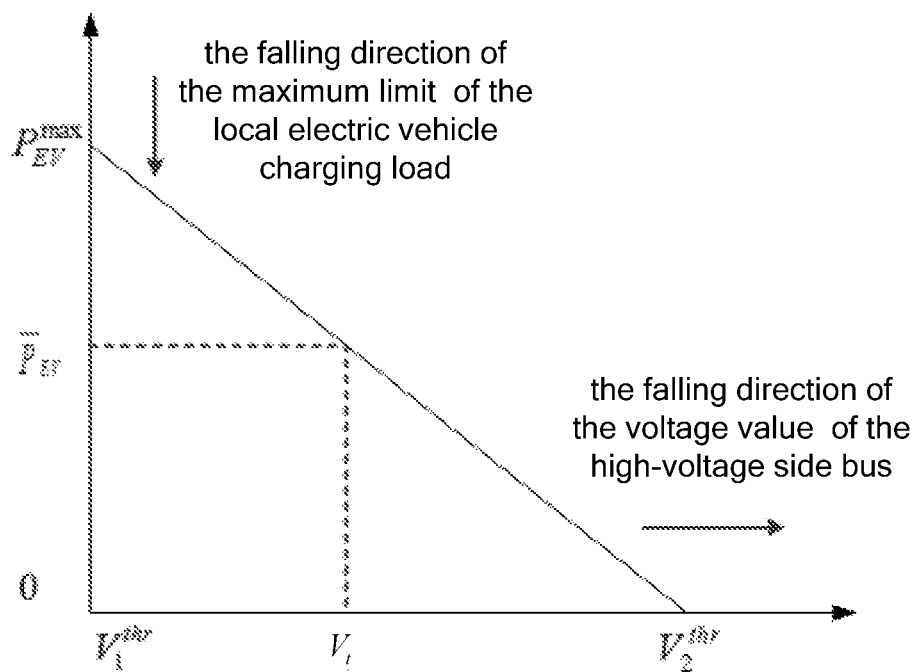
FIG. 3 is a schematic diagram illustrating a relationship between a maximum limit of a local electric vehicle charging load and a voltage value of a high-voltage side bus in a local transformer sub station.

It should be noted that, a relationship between the maximum limit $P_{EV}^{max}$ of the local electric vehicle charging load and the voltage value of the high-voltage side bus in the local transformer substation may be illustrated in FIG. 3. The maximum limit $P_{EV}^{max}$ of the local electric vehicle charging load will become smaller as the voltage value of the high-voltage side bus in the local transformer substation becomes smaller.

S316, a setting value $P_{EV}^{set}$ of the electric vehicle charging power is calculated according to the allowable step size $dP_{EV}$ of the voltage enhancement control and the current electric vehicle charging power $P_{EV}$, and the setting value $P_{EV}^{set}$ of the electric vehicle charging power is sent to the electric vehicle charging station, such that the electric vehicle charging station charges the electric vehicles according to the setting value $P_{EV}^{set}$.

Specifically, the setting value $P_{EV}^{set}$ of the electric vehicle charging power may be obtained by adding the allowable step size $dP_{EV}$ of the voltage enhancement control to the current electric vehicle charging power $P_{EV}$, and then the setting value $P_{EV}^{set}$ of the electric vehicle charging power is sent to the electric vehicle charging station, such that the electric vehicle charging station charges the electric vehicles according to the setting value $P_{EV}^{set}$.

Specifically, after the electric vehicle charging station charges the electric vehicles according to the setting value $P_{EV}^{set}$ for the predetermined time period (i.e. it is over the predetermined time period $t_p$ since step S311 is performed), steps S1-S3 are performed again.

In other words, after the electric vehicle charging station charges the electric vehicles according to the setting value $P_{EV}^{set}$ for the predetermined time period, the first voltage value of the high-voltage side bus in the local transformer substation is obtained again, and the control strategy is determined again according to the starting threshold value for the voltage enhancement control, the starting threshold value for the under-voltage load shedding and the first voltage value of the high-voltage side bus, and the control strategy is performed again to control the charging power of the electric vehicle charging station, so as to control the local voltage of the local transformer sub station.

Figure 4:
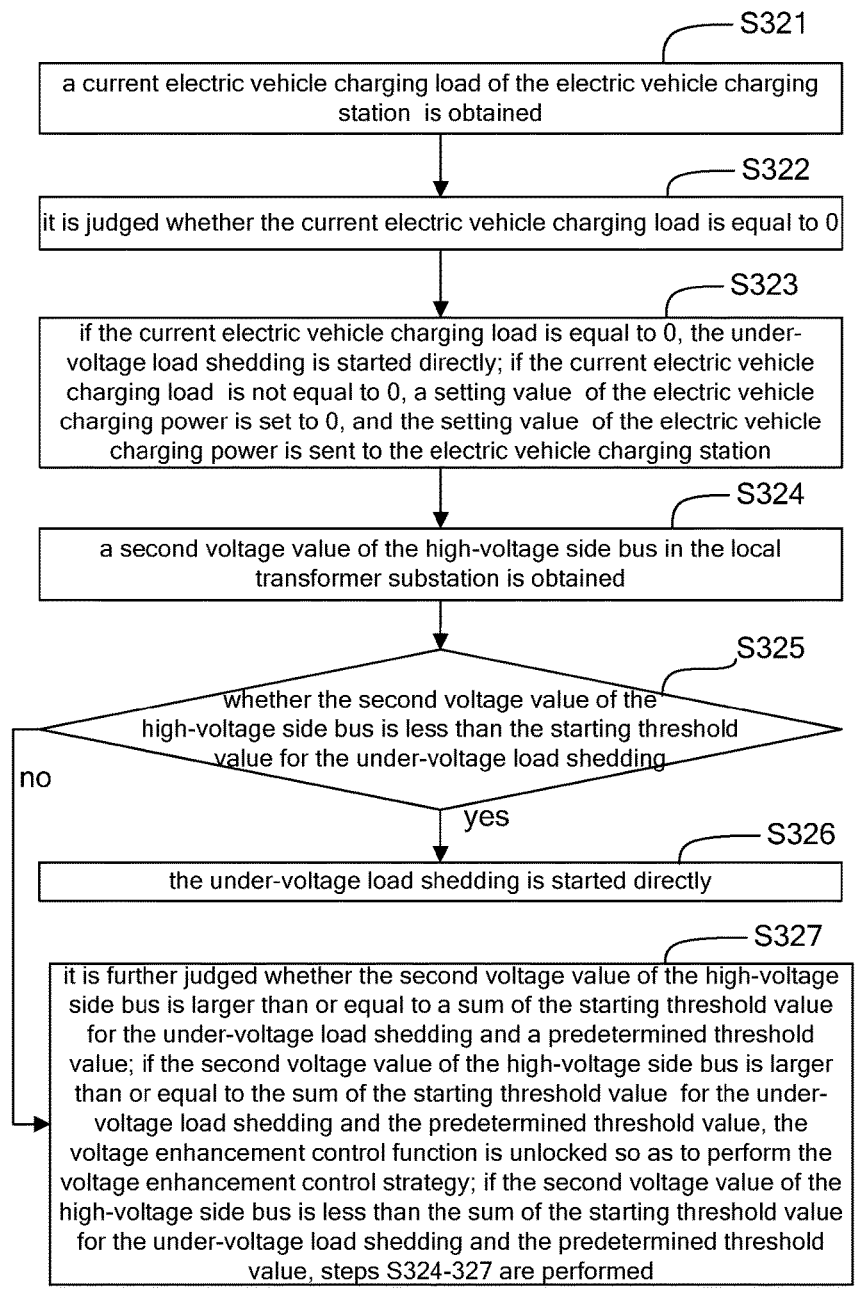
FIG. 4 is a flow chart showing a method for performing a voltage emergency control strategy according to an embodiment of the present disclosure.

In some embodiments, if the first voltage value $V_t$ of the high-voltage side bus is less than the starting threshold value $V_2^{thr}$ for the under-voltage load shedding, the voltage emergency control strategy is performed. Firstly, a voltage enhancement control function is locked to prevent the voltage enhancement control strategy from being performed, then the current electric vehicle charging load is obtained from the electric vehicle charging station corresponding to the local transformer substation, and then a coordination control is performed according to the current electric vehicle charging load. Specifically, as shown in FIG. 4, the step of performing the voltage emergency control strategy includes following steps.

S321, a current electric vehicle charging load of the electric vehicle charging station is obtained.

S322, it is judged whether the current electric vehicle charging load is equal to 0.

S323, if the current electric vehicle charging load is equal to 0, the under-voltage load shedding is started directly; if the current electric vehicle charging load is not equal to 0, a setting value $P_{EV}^{set}$ of the electric vehicle charging power is set to 0, and the setting value $P_{EV}^{set}$ of the electric vehicle charging power is sent to the electric vehicle charging station.

It should be understood that, in some embodiments, the under-voltage load shedding may be performed by a module in the local transformer substation.

Specifically, if the current electric vehicle charging load is not equal to 0, the voltage emergency control is started. Firstly, the setting value $P_{EV}^{set}$ of the electric vehicle charging power is set to 0, and then the setting value $P_{EV}^{set}$ of the electric vehicle charging power is sent to the electric vehicle charging station, such that the electric vehicle charging station would not charge the electric vehicles.

S324, a second voltage value of the high-voltage side bus in the local transformer substation is obtained;

Specifically, in a process that the electric vehicle charging station charges the electric vehicles according to the setting value $P_{EV}^{set}$ of the electric vehicle charging power, the second voltage value of the high-voltage side bus in the local transformer substation is obtained.

S325, it is judged whether the second voltage value of the high-voltage side bus is less than the starting threshold value $V_2^{thr}$ for the under-voltage load shedding.

S326, if the second voltage value of the high-voltage side bus is less than the starting threshold value $V_2^{thr}$ for the under-voltage load shedding, the under-voltage load shedding is started directly.

S327, if the second voltage value of the high-voltage side bus is larger than or equal to the starting threshold value $V_2^{thr}$ for the under-voltage load shedding, it is further judged whether the second voltage value of the high-voltage side bus is larger than or equal to a sum of the starting threshold value $V_2^{thr}$ for the under-voltage load shedding and a predetermined threshold value; if the second voltage value of the high-voltage side bus is larger than or equal to the sum of the starting threshold value $V_2^{thr}$ for the under-voltage load shedding and the predetermined threshold value, the voltage enhancement control function is unlocked so as to perform the voltage enhancement control strategy; if the second voltage value of the high-voltage side bus is less than the sum of the starting threshold value $V_2^{thr}$ for the under-voltage load shedding and the predetermined threshold value, steps S324-327 are performed.

In some embodiments, the predetermined threshold value is set in advance. Specifically, if the second voltage value of the high-voltage side bus is larger than or equal to the sum of the starting threshold value $V_2^{thr}$ for the under-voltage load shedding and the predetermined threshold value, the voltage enhancement control strategy is performed, and after it is over the predetermined time period since step S321 is performed, steps S1-S3 are performed again. In other words, the first voltage value of the high-voltage side bus in the local transformer substation is obtained again, and the control strategy is determined again according to the starting threshold value for the voltage enhancement control, the starting threshold value for the under-voltage load shedding and the first voltage value of the high-voltage side bus, and the control strategy is performed again to control the charging power of the electric vehicle charging station, so as to control the local voltage of the local transformer substation.

It can be seen that, when the power grid is under the emergency condition, the current power grid operation pressure may be relieved by shifting the electric vehicle charging load backwards. It may help the power grid to pass through the critical time by making full use of the flexible characteristics of the electric vehicle charging load and increasing the benign interaction between the electric vehicle charging load and the power system.

Therefore, Different control strategies may be selected to perform corresponding calculations according to different voltage measurement values of the local node, and then the local voltage may be controlled according to calculation results. During the whole security control process, the electric vehicle charging load is brought into the power grid voltage security control system, thus enhancing the power grid voltage security and ensuring the security and stable operation of the power grid.

With the method for controlling a local voltage according to embodiments of the present disclosure, by obtaining the first voltage value of the high-voltage side bus in the local transformer substation, and by determining the control strategy according to the starting threshold value for the voltage enhancement control, the starting threshold value for the under-voltage load shedding and the first voltage value of the high-voltage side bus, and then by performing the control strategy to control a charging power of an electric vehicle charging station corresponding to the local transformer substation, so as to control the local voltage of the local transformer substation, i.e. by collecting the voltage value of the high-voltage side bus in the local transformer substation, information about the electric vehicle charging power of the electric vehicle charging station corresponding to the local transformer substation, and by controlling the electric vehicle charging power of the electric vehicle charging station, the voltage security of the power grid may be ensured, the voltage stability of the power system may be optimized and the risk of the power system voltage collapse may be reduced.

A device for controlling a local voltage also is provided by embodiments of the present disclosure. Since the device for controlling a local voltage according to embodiments of the present disclosure corresponds to the method controlling a local voltage as described above, implementation manners of the above method controlling a local voltage also are applied to the device for controlling a local voltage according to embodiments of the present disclosure, which are not elaborated herein again.

Figure 5:
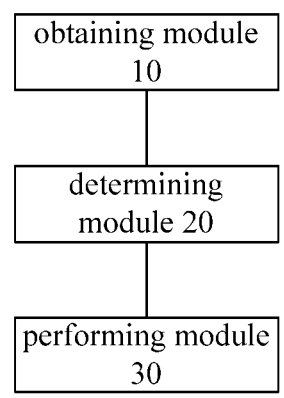
FIG. 5 is a block diagram illustrating a device for controlling a local voltage according to an embodiment of the present disclosure.

FIG. 5 is a block diagram illustrating a device for controlling a local voltage according to an embodiment of the present disclosure. As shown in FIG. 5, the device for controlling a local voltage includes an obtaining module 10, a determining module 20 and a performing module 30.

The obtaining module 10 is configured to obtain a first voltage value $V_t$ of a high-voltage side bus in a local transformer substation.

The determining module 20 is configured to determine a control strategy according to a starting threshold value $V_1^{thr}$ for a voltage enhancement control, a starting threshold value $V_2^{thr}$ for an under-voltage load shedding and the first voltage value $V_t$ of the high-voltage side bus, in which the starting threshold value $V_1^{thr}$ for the voltage enhancement control and the starting threshold value $V_2^{thr}$ for the under-voltage load shedding technology are predetermined.

The performing module 30 is configured to perform the control strategy to control a charging power of an electric vehicle charging station corresponding to the local transformer substation, so as to control the local voltage of the local transformer substation.

In some embodiments, the starting threshold value $V_1^{thr}$ for the voltage enhancement control and the starting threshold value $V_2^{thr}$ for the under-voltage load shedding are obtained from a power grid dispatching center.

In some embodiments, if the first voltage value $V_t$ of the high-voltage side bus is less than the starting threshold value $V_1^{thr}$ for the voltage enhancement control and larger than the starting threshold value $V_2^{thr}$ for the under-voltage load shedding, the control strategy is a voltage enhancement control strategy, i.e. the performing module 30 is configured to perform the voltage enhancement control strategy; and if the first voltage value $V_t$ of the high-voltage side bus is less than the starting threshold value $V_2^{thr}$ low for the under-voltage load shedding, the control strategy is a voltage emergency control strategy, i.e. the performing module 30 is configured to perform the voltage emergency control strategy. In addition, if the first voltage value $V_t$ of the high-voltage side bus is larger than the starting threshold value $V_1^{thr}$ for the voltage enhancement control, no control measure is required.

In some embodiments, the performing module 30 includes a first obtaining unit, a first judging unit, a first calculating unit, a second calculating unit, a third calculating unit, a fourth calculating unit and a first sending unit.

The first obtaining unit is configured to obtain a current electric vehicle charging power $P_{EV}$ of the electric vehicle charging station corresponding to the local transformer substation.

The first judging unit is configured to judge whether the electric vehicle charging station has a vehicle-to-grid function.

The first calculating unit is configured to calculate a droop coefficient $\alpha$ according to a maximum limit $P_{EV}^{max}$ of a local electric vehicle charging load, the starting threshold value $V_1^{thr}$ for the voltage enhancement control and the starting threshold value $V_2^{thr}$ for the under-voltage load shedding, and to calculate an intercept coefficient $\beta$ according to the droop coefficient $\alpha$ and the starting threshold value $V_2^{thr}$ for the under-voltage load shedding, if the electric vehicle charging station does not have the vehicle-to-grid function, in which the maximum limit $P_{EV}^{max}$ of the local electric vehicle charging load is predetermined and obtained from the power grid dispatching center.

The second calculating unit is configured to calculate the droop coefficient $\alpha$ according to the maximum limit $P_{EV}^{max}$ of the local electric vehicle charging load, the starting threshold value $V_1^{thr}$ for the voltage enhancement control, the starting threshold value $V_2^{thr}$ for the under-voltage load shedding and a minimum limit $P_{EV}^{min}$ of the electric vehicle charging power, and to calculate the intercept coefficient $\beta$ according to the droop coefficient $\alpha$, the minimum limit $P_{EV}^{min}$ of the electric vehicle charging power and the starting threshold value $V_2^{thr}$ for the under-voltage load shedding, if the electric vehicle charging station has the vehicle-to-grid function.

The third calculating unit is configured to calculate an allowable upper limit $\overline{P}_{EV}$ of the current electric vehicle charging power $P_{EV}$ according to the droop coefficient $\alpha$ and the intercept coefficient $\beta$, and to calculate an allowable step size $dP_{EV}$ of the voltage enhancement control according to the allowable upper limit $\overline{P}_{EV}$ of the current electric vehicle charging power $P_{EV}$.

The fourth calculating unit is configured to calculate a setting value $P_{EV}^{set}$ of the electric vehicle charging power according to the allowable step size $dP_{EV}$ of the voltage enhancement control and the current electric vehicle charging power $P_{EV}$.

The first sending unit is configured to send the setting value $P_{EV}^{set}$ of the electric vehicle charging power to the electric vehicle charging station, such that the electric vehicle charging station charges the electric vehicles according to the setting value $P_{EV}^{set}$.

In some embodiments, the maximum limit $P_{EV}^{max}$ of the local electric vehicle charging load is obtained from a power grid dispatching center.

In some embodiments, the minimum limit $P_{EV}^{min}$ of the electric vehicle charging power is obtained by a formula of $$P_{EV}^{min} = -\frac{W_{EV}}{t_p}$$

where $W_{EV}$ represents a battery storage capacity of all electric vehicles in the electric vehicle charging station, and $t_p$ is a predetermined time period, representing a time interval between each two voltage enhancement controls.

In some embodiments, the allowable step size $dP_{EV}$ of the voltage enhancement control is calculated according to the allowable upper limit $\overline{P}_{EV}$ of the current electric vehicle charging power by a formula of $$dP_{EV} = \begin{cases} \overline{P}_{EV} - P_{EV}, & \text{if } 0 < \overline{P}_{EV} - P_{EV} \leq dP_{EV}^{max} \\ dP_{EV}^{max}, & \text{if } \overline{P}_{EV} - P_{EV} > dP_{EV}^{max} \end{cases}$$

where $dP_{EV}$ represents the allowable step size of the voltage enhancement control, $dP_{EV}^{max}$ represents an allowable maximum step size in a single voltage enhancement control, $\overline{P}_{EV}$ represents the allowable upper limit of the current electric vehicle charging power, and $P_{EV}$ represents the current electric vehicle charging power.

In some embodiments, the performing module 30 further includes: a second obtaining unit, a second judging unit, a first starting unit, a setting and sending unit, a third obtaining unit, a third judging unit, a second starting unit and a fourth judging unit.

The second obtaining unit is configured to lock a voltage enhancement control function, and to obtain a current electric vehicle charging load of the electric vehicle charging station. The second judging unit is configured to judge whether the current electric vehicle charging load is equal to 0.

The first starting unit is configured to start directly the under-voltage load shedding if the current electric vehicle charging load is equal to 0.

The setting and sending unit is configured to set a setting value $P_{EV}^{set}$ of the electric vehicle charging power to 0, and to send the setting value $P_{EV}^{set}$ of the electric vehicle charging power to the electric vehicle charging station, if the current electric vehicle charging load is not equal to 0.

The third obtaining unit is configured to obtain a second voltage value of the high-voltage side bus in the local transformer substation.

The third judging unit is configured to judge whether the second voltage value of the high-voltage side bus is less than the starting threshold value $V_2^{thr}$ for the under-voltage load shedding.

The second starting unit is configured to start directly the under-voltage load shedding, if the second voltage value of the high-voltage side bus is less than the starting threshold value $V_2^{thr}$ for the under-voltage load shedding.

The fourth judging unit is configured to judge whether the second voltage value of the high-voltage side bus is larger than or equal to a sum of the starting threshold value $V_2^{thr}$ for the under-voltage load shedding and a predetermined threshold value, if the second voltage value of the high-voltage side bus is larger than or equal to the starting threshold value $V_2^{thr}$ for the under-voltage load shedding. If the second voltage value of the high-voltage side bus is larger than or equal to the sum of the starting threshold value $V_2^{thr}$ for the under-voltage load shedding and the predetermined threshold value, the performing module 30 performs the voltage enhancement control strategy. If the second voltage value of the high-voltage side bus is less than the sum of the starting threshold value $V_2^{thr}$ for the under-voltage load shedding and the predetermined threshold value, the performing module 30 enables the third obtaining unit, the third judging unit, the second starting unit and the fourth judging unit to work again.

With the device for controlling a local voltage according to embodiments of the present disclosure, by obtaining the first voltage value of the high-voltage side bus in the local transformer substation, and by determining the control strategy according to the starting threshold value for the voltage enhancement control, the starting threshold value for the under-voltage load shedding and the first voltage value of the high-voltage side bus, and then by performing the control strategy to control a charging power of an electric vehicle charging station corresponding to the local transformer substation, so as to control the local voltage of the local transformer substation, i.e. by collecting the voltage value of the high-voltage side bus in the local transformer substation, information about the electric vehicle charging power of the electric vehicle charging station corresponding to the local transformer substation, and by controlling the electric vehicle charging power of the electric vehicle charging station, the voltage security of the power grid may be ensured, the voltage stability of the power system may be optimized and the risk of the power system voltage collapse may be reduced.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed. In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium. The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a local voltage, comprising:
S1, obtaining a first voltage value of a high-voltage side bus in a local transformer substation;
S2, determining a control strategy according to a starting threshold value for a voltage enhancement control, a starting threshold value for an under-voltage load shedding and the first voltage value of the high-voltage side bus, wherein the starting threshold value for the voltage enhancement control and the starting threshold value for the under-voltage load shedding are predetermined; and
S3, performing the control strategy to control a charging power of an electric vehicle charging station corresponding to the local transformer substation, so as to control the local voltage of the local transformer substation;
wherein if the first voltage value of the high-voltage side bus is less than the starting threshold value for the voltage enhancement control and larger than the starting threshold value for the under-voltage load shedding, performing the control strategy comprises: performing a voltage enhancement control strategy;
if the first voltage value of the high-voltage side bus is less than the starting threshold value for the under-voltage load shedding, performing the control strategy comprises: performing a voltage emergency control strategy;
wherein performing a voltage enhancement control strategy comprises:
S311, obtaining a current electric vehicle charging power of the electric vehicle charging station;
S312, judging whether the electric vehicle charging station has a vehicle-to-grid function;
S313, if the electric vehicle charging station does not have the vehicle-to-grid function, calculating a droop coefficient according to a maximum limit of a local electric vehicle charging load, the starting threshold value for the voltage enhancement control and the starting threshold value for the under-voltage load shedding, and calculating an intercept coefficient according to the droop coefficient and the starting threshold value for the under-voltage load shedding;
S314, if the electric vehicle charging station has the vehicle-to-grid function, calculating the droop coefficient according to the maximum limit of the local electric vehicle charging load, the starting threshold value for the voltage enhancement control, the starting threshold value for the under-voltage load shedding and a minimum limit of an electric vehicle charging power, and calculating the intercept coefficient according to the droop coefficient, the minimum limit of the electric vehicle charging power and the starting threshold value for the under-voltage load shedding;
S315, calculating an allowable upper limit of the current electric vehicle charging power according to the droop coefficient and the intercept coefficient, and calculating an allowable step size of the voltage enhancement control according to the allowable upper limit of the current electric vehicle charging power; and S316, calculating a setting value of the electric vehicle charging power according to the allowable step size of the voltage enhancement control and the current electric vehicle charging power, and sending the setting value of the electric vehicle charging power to the electric vehicle charging station, such that the electric vehicle charging station charges electric vehicles according to the setting value.

2. The method according to claim 1, wherein the starting threshold value for the voltage enhancement control and the starting threshold value for the under-voltage load shedding are obtained from a power grid dispatching center.

3. The method according to claim 1, wherein the maximum limit of the local electric vehicle charging load is obtained from a power grid dispatching center.

4. The method according to claim 1, wherein the minimum limit of the electric vehicle charging power is obtained by a formula of:

$$P_{EV}^{min} = -\frac{W_{EV}}{t_p}$$

where $P_{EV}^{min}$ represents the minimum limit of the electric vehicle charging power, $W_{EV}$ represents a battery storage capacity of all electric vehicles in the electric vehicle charging station, and $t_p$ is a predetermined time period, representing a time interval between each two voltage enhancement controls.

5. The method according to claim 1, wherein the allowable step size of the voltage enhancement control is calculated according to the allowable upper limit of the current electric vehicle charging power by a formula of $$dP_{EV} = \begin{cases} \overline{P}_{EV} - P_{EV}, & \text{if } 0 < \overline{P}_{EV} - P_{EV} \le dP_{EV}^{max} \\ dP_{EV}^{max}, & \text{if } \overline{P}_{EV} - P_{EV} > dP_{EV}^{max} \end{cases}$$

where $dP_{EV}$ represents the allowable step size of the voltage enhancement control, $dP_{EV}^{max}$ represents an allowable maximum step size in a voltage enhancement control, $\overline{P}_{EV}$ represents the allowable upper limit of the current electric vehicle charging power, and $P_{EV}$ represents the current electric vehicle charging power.

6. The method according to claim 1, wherein performing a voltage emergency control strategy comprises:

S321, obtaining a current electric vehicle charging load of the electric vehicle charging station;

S322, judging whether the current electric vehicle charging load is equal to 0;

S323, if the current electric vehicle charging load is equal to 0, performing the under-voltage load shedding; if the current electric vehicle charging load is not equal to 0, setting a setting value of the electric vehicle charging power to 0, and sending the setting value of the electric vehicle charging power to the electric vehicle charging station;

S324, obtaining a second voltage value of the high-voltage side bus in the local transformer substation;

S325, judging whether the second voltage value of the high-voltage side bus is less than the starting threshold value for the under-voltage load shedding;

S326, if the second voltage value of the high-voltage side bus is less than the starting threshold value for the under-voltage load shedding, performing the under-voltage load shedding; and S327, if the second voltage value of the high-voltage side bus is larger than or equal to the starting threshold value for the under-voltage load shedding, further judging whether the second voltage value of the high-voltage side bus is larger than or equal to a sum of the starting threshold value for the under-voltage load shedding and a predetermined threshold value; if the second voltage value of the high-voltage side bus is larger than or equal to the sum of the starting threshold value for the under-voltage load shedding, performing a voltage enhancement control strategy; if the second voltage value of the high-voltage side bus is less than the sum of the starting threshold value for the under-voltage load shedding and the predetermined threshold value, performing steps S324-S327.

7. A device for controlling a local voltage, comprising:
a processor; and
a memory for storing instructions executable by the processor;
wherein the processor is configured to:
obtain a first voltage value of a high-voltage side bus in a local transformer substation;
determine a control strategy according to a starting threshold value for a voltage enhancement control, a starting threshold value for an under-voltage load shedding and the first voltage value of the high-voltage side bus, wherein the starting threshold value for the voltage enhancement control and the starting threshold value for the under-voltage load shedding are predetermined; and
perform the control strategy to control a charging power of an electric vehicle charging station corresponding to the local transformer substation, so as to control the local voltage of the local transformer substation;
wherein if the first voltage value of the high-voltage side bus is less than the starting threshold value for the voltage enhancement control and larger than the starting threshold value for the under-voltage load shedding, the processor is configured to perform the control strategy by performing a voltage enhancement control strategy;
if the first voltage value of the high-voltage side bus is less than the starting threshold value for the under-voltage load shedding, the processor is configured to perform the control strategy by performing a voltage emergency control strategy;
wherein the processor is configured to perform the voltage enhancement control strategy by steps of:
S311, obtaining a current electric vehicle charging power of the electric vehicle charging station;
S312, judging whether the electric vehicle charging station has a vehicle-to-grid function;
S313, if the electric vehicle charging station does not have the vehicle-to-grid function, calculating a droop coefficient according to a maximum limit of a local electric vehicle charging load, the starting threshold value for the voltage enhancement control and the starting threshold value for the under-voltage load shedding, and calculating an intercept coefficient according to the droop coefficient and the starting threshold value for the under-voltage load shedding;
S314, if the electric vehicle charging station has the vehicle-to-grid function, calculating the droop coefficient according to the maximum limit of the local electric vehicle charging load, the starting threshold value for the voltage enhancement control, the starting threshold value for the under-voltage load shedding and a minimum limit of an electric vehicle charging power, and calculating the intercept coefficient according to the droop coefficient, the minimum limit of the electric vehicle charging power and the starting threshold value for the under-voltage load shedding;

S315, calculating an allowable upper limit of the current electric vehicle charging power according to the droop coefficient and the intercept coefficient, and calculating an allowable step size of the voltage enhancement control according to the allowable upper limit of the current electric vehicle charging power; and S316, calculating a setting value of the electric vehicle charging power according to the allowable step size of the voltage enhancement control and the current electric vehicle charging power, and sending the setting value of the electric vehicle charging power to the electric vehicle charging station, such that the electric vehicle charging station charges electric vehicles according to the setting value.

8. The device according to claim 7, wherein the starting threshold value for the voltage enhancement control and the starting threshold value for the under-voltage load shedding are obtained from a power grid dispatching center.

9. The device according to claim 7, wherein the maximum limit of the local electric vehicle charging load is obtained from a power grid dispatching center.

10. The device according to claim 7, wherein the minimum limit of the electric vehicle charging power is obtained by a formula of $$P_{EV}^{min} = -\frac{W_{EV}}{t_p}$$

where $P_{EV}^{min}$ represents the minimum limit of the electric vehicle charging power, $W_{EV}$ represents a battery storage capacity of all electric vehicles in the electric vehicle charging station, and $t_p$ is a predetermined time period, representing a time interval between each two voltage enhancement controls.

11. The device according to claim 7, wherein the allowable step size of the voltage enhancement control is calculated according to the allowable upper limit of the current electric vehicle charging power by a formula of $$dP_{EV} = \begin{cases} \overline{P}_{EV} - P_{EV}, & \text{if } 0 < \overline{P}_{EV} - P_{EV} \leq dP_{EV}^{max} \\ dP_{EV}^{max}, & \text{if } \overline{P}_{EV} - P_{EV} > dP_{EV}^{max} \end{cases}$$

where $dP_{EV}$ represents the allowable step size of the voltage enhancement control, $dP_{EV}^{max}$ represents an allowable maximum step size in a voltage enhancement control, $\overline{P}_{EV}$ represents the allowable upper limit of the current electric vehicle charging power, and $P_{EV}$ represents the current electric vehicle charging power.

12. The device according to claim 7, wherein the processor is configured to perform the voltage emergency control strategy by steps of:

S321, obtaining a current electric vehicle charging load of the electric vehicle charging station;

S322, judging whether the current electric vehicle charging load is equal to 0;

S323, if the current electric vehicle charging load is equal to 0, performing the under-voltage load shedding; if the current electric vehicle charging load is not equal to 0, setting a setting value of the electric vehicle charging power to 0, and sending the setting value of the electric vehicle charging power to the electric vehicle charging station;

S324, obtaining a second voltage value of the high-voltage side bus in the local transformer substation;

S325, judging whether the second voltage value of the high-voltage side bus is less than the starting threshold value for the under-voltage load shedding;

S326, if the second voltage value of the high-voltage side bus is less than the starting threshold value for the under-voltage load shedding, performing the under-voltage load shedding; and S327, if the second voltage value of the high-voltage side bus is larger than or equal to the starting threshold value for the under-voltage load shedding, further judging whether the second voltage value of the high-voltage side bus is larger than or equal to a sum of the starting threshold value for the under-voltage load shedding and a predetermined threshold value; if the second voltage value of the high-voltage side bus is larger than or equal to the sum of the starting threshold value for the under-voltage load shedding, performing a voltage enhancement control strategy; if the second voltage value of the high-voltage side bus is less than the sum of the starting threshold value for the under-voltage load shedding and the predetermined threshold value, performing steps S324-S327.

13. A non-transitory computer readable storage medium, comprising a computer program stored thereon, which when executed by an instruction execution system, causes the system to implement a method for controlling a local voltage, the method comprising:

S1, obtaining a first voltage value of a high-voltage side bus in a local transformer substation;

S2, determining a control strategy according to a starting threshold value for a voltage enhancement control, a starting threshold value for an under-voltage load shedding and the first voltage value of the high-voltage side bus, wherein the starting threshold value for the voltage enhancement control and the starting threshold value for the under-voltage load shedding are predetermined; and S3, performing the control strategy to control a charging power of an electric vehicle charging station corresponding to the local transformer substation, so as to control the local voltage of the local transformer substation;

wherein if the first voltage value of the high-voltage side bus is less than the starting threshold value for the voltage enhancement control and larger than the starting threshold value for the under-voltage load shedding, performing the control strategy comprises: performing a voltage enhancement control strategy;

if the first voltage value of the high-voltage side bus is less than the starting threshold value for the under-voltage load shedding, performing the control strategy comprises: performing a voltage emergency control strategy;

wherein performing a voltage enhancement control strategy comprises:

S311, obtaining a current electric vehicle charging power of the electric vehicle charging station;

S312, judging whether the electric vehicle charging station has a vehicle-to-grid function;

S313, if the electric vehicle charging station does not have the vehicle-to-grid function, calculating a droop coefficient according to a maximum limit of a local electric vehicle charging load, the starting threshold value for the voltage enhancement control and the starting threshold value for the under-voltage load shedding, and calculating an intercept coefficient according to the droop coefficient and the starting threshold value for the under-voltage load shedding;

S314, if the electric vehicle charging station has the vehicle-to-grid function, calculating the droop coefficient according to the maximum limit of the local electric vehicle charging load, the starting threshold value for the voltage enhancement control, the starting threshold value for the under-voltage load shedding and a minimum limit of an electric vehicle charging power, and calculating the intercept coefficient according to the droop coefficient, the minimum limit of the electric vehicle charging power and the starting threshold value for the under-voltage load shedding;

S315, calculating an allowable upper limit of the current electric vehicle charging power according to the droop coefficient and the intercept coefficient, and calculating an allowable step size of the voltage enhancement control according to the allowable upper limit of the current electric vehicle charging power; and S316, calculating a setting value of the electric vehicle charging power according to the allowable step size of the voltage enhancement control and the current electric vehicle charging power, and sending the setting value of the electric vehicle charging power to the electric vehicle charging station, such that the electric vehicle charging station charges electric vehicles according to the setting value.

* * * * *